(12) United States Patent
Araki et al.

(10) Patent No.: US 9,479,100 B2
(45) Date of Patent: Oct. 25, 2016

(54) ELECTRIC MOTOR CONTROLLER

(71) Applicant: DAIKIN INDUSTRIES, LTD., Osaka-shi, Osaka (JP)

(72) Inventors: Takeshi Araki, Kusatsu (JP); Naoto Kobayashi, Kusatsu (JP); Nobuki Kitano, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/424,478

(22) PCT Filed: Jul. 11, 2013

(86) PCT No.: PCT/JP2013/068955
§ 371 (c)(1),
(2) Date: Feb. 27, 2015

(87) PCT Pub. No.: WO2014/034291
PCT Pub. Date: Mar. 6, 2014

(65) Prior Publication Data
US 2015/0229258 A1   Aug. 13, 2015

(30) Foreign Application Priority Data

Aug. 30, 2012 (JP) ................................. 2012-189804

(51) Int. Cl.
*H02P 21/00* (2016.01)
*H02P 21/12* (2016.01)
*H02P 21/14* (2016.01)

(52) U.S. Cl.
CPC ........... *H02P 21/12* (2013.01); *H02P 21/0003* (2013.01); *H02P 21/141* (2013.01)

(58) Field of Classification Search
CPC ............. H02P 21/141; H02P 29/0066; H02P 2207/05

USPC .............. 318/400.02, 400.2, 400.26, 400.34, 318/709, 711, 712, 716, 718, 720, 722
See application file for complete search history.

(56) References Cited

U.S. PATENT DOCUMENTS 5,038,092 A * 8/1991 Asano ............... H02M 7/53875
    318/799
5,057,759 A * 10/1991 Ueda ....................... H02P 21/13
    318/561

(Continued)

FOREIGN PATENT DOCUMENTS

JP         4-91693 A    3/1992
JP      2000-60195 A    2/2000

(Continued)

OTHER PUBLICATIONS

Hotta et al., "Method of Controlling Position Sensorless DC Brushless Motor," Tokai-Section Joint Conference of the Institutes of Electrical and Related Engineers, 1998, pp. 161, along with an English translation.

(Continued)

*Primary Examiner* — Bentsu Ro
*Assistant Examiner* — Thai Dinh
(74) *Attorney, Agent, or Firm* — Birch, Stewart, Kolasch & Birch, LLP

(57) ABSTRACT

An electric motor controller includes a first coordinate conversion unit that converts a three-phase current into a current in a δc-γc rotating coordinate system, a first calculation unit that obtains a first term, a second calculation unit that obtains a voltage command value in the δc-γc rotating coordinate system as a sum of the first term and a second term, a second coordinate conversion unit that coordinate-converts the voltage command value into a voltage command value of a voltage to be applied to a rotary electric motor in another coordinate system.

10 Claims, 10 Drawing Sheets

(56) References Cited

U.S. PATENT DOCUMENTS

| | | | | |
|---|---|---|---|---|
| 6,344,725 | B2* | 2/2002 | Kaitani | 318/700 |
| 6,933,701 | B2* | 8/2005 | Kinpara | H02P 6/18 318/700 |
| 7,084,591 | B2* | 8/2006 | Kobayashi | H02P 21/06 318/400.02 |
| 7,554,281 | B2* | 6/2009 | Satake | B60L 11/1803 318/400.15 |
| 8,373,370 | B2* | 2/2013 | Kwon | H02P 21/0017 318/400.01 |
| 8,525,454 | B2* | 9/2013 | Kimpara | H02P 29/032 318/400.02 |
| 8,912,739 | B2* | 12/2014 | Kobayashi | H02P 21/141 318/400.02 |
| 2012/0001573 | A1* | 1/2012 | Kimpara | H02P 29/028 318/400.02 |

FOREIGN PATENT DOCUMENTS

| | | | |
|---|---|---|---|
| JP | 2000060195 A | * | 2/2000 |
| JP | 3672761 B2 | | 7/2005 |
| JP | 2011-61887 A | | 3/2011 |
| JP | 2011061887 A | * | 3/2011 |
| WO | WO 2005/112249 A1 | | 11/2005 |

OTHER PUBLICATIONS

Kaku et al, "A Novel Technique for a DC Brushless Motor Having No Position-Sensors," IEEJ Transaction on Industry Applications, vol. 111, No. 8, 1991, pp. 639-644, along with an English abstract.

Kaku et al., "A Novel Technique for a DC Brushless Motor Having No Position-Sensors," Tokai-Section Joint Conference of the Institutes of Electrical and Engineers, 1990, pp. 172, along with an English translation.

Urita et al., "Constant Estimation Method for Synchronous Machines with the Primary Magnetic Flux Controlled," Tokai-Section Joint Conference of the Institutes of Electrical Engineers, 1998, pp. 101, along with an English translation.

Urita et al., "On General Purpose Inverter for Synchronous Motor Drive," IEEJ Transaction on Industry Applications, vol. 119, No. 5, 1999, pp. 707-712, along with an English abstract.

Yabe et al., "A Sensor-less Drive of IPM Motor with Over-modulation PWM," The papers of Joint Technical Meeting on Rotating Machinery, IEE Japan,(159), 2001, pp. 7-12, along with an English abstract.

* cited by examiner

F I G. 9
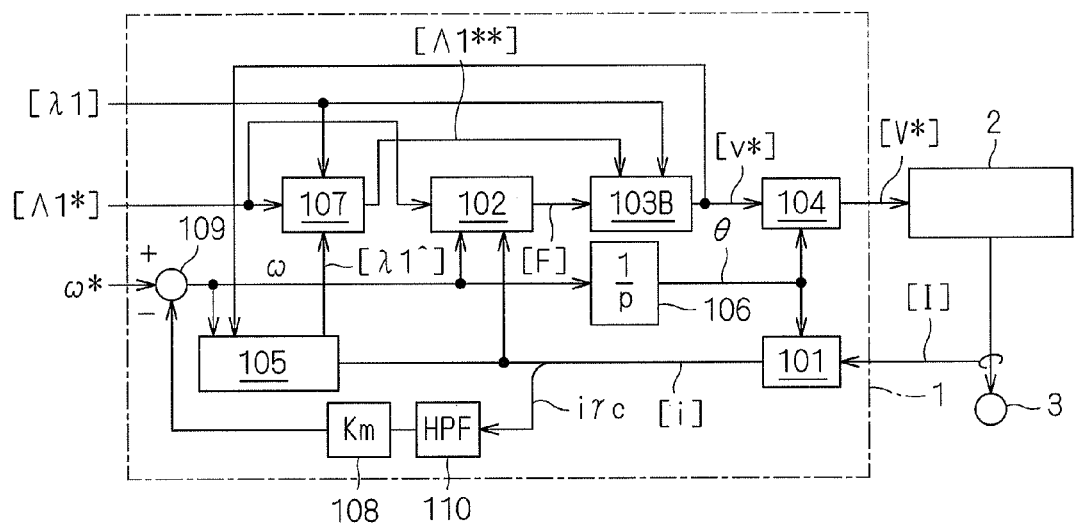

ELECTRIC MOTOR CONTROLLER

TECHNICAL FIELD

The present technique relates to controlling a synchronous motor comprising a field and an armature.

More particularly, the present technique relates to controlling a rotary electric motor on the basis of a so-called primary magnetic flux which is a synthesis of a field flux that the field generates and a magnetic flux of an armature reaction generated by an armature current flowing in the armature.

BACKGROUND ART

Conventionally, various controls of a rotary electric motor on the basis of a primary magnetic flux, i.e., a so-called primary magnetic flux controls have been proposed. Briefly speaking, the primary magnetic flux control is a technique for stably controlling the rotary electric motor by controlling the primary magnetic flux of the rotary electric motor in accordance with a command value thereof.

It is assumed, for example, that a phase of a field flux $\Lambda 0$ is employed at a d axis in rotating coordinate system, a phase of a primary magnetic flux $\lambda 1$ is employed at a $\delta$ axis in another rotating coordinate system, and a phase difference of the $\delta$ axis with respect to the d axis is a load angle $\phi$. Herein, however, a $\gamma$ axis is employed at a 90-degree leading phase with respect to the $\delta$ axis. Further, a $\delta c$ axis and a $\gamma c$ axis are defined as control axes in the rotating coordinate system which is employed in the primary magnetic flux control. The $\delta c$ axis and the $\gamma c$ axis are corresponding to the $\delta$ axis and the $\gamma$ axis, respectively, and a phase difference of the $\delta c$ axis with respect to the d axis is assumed as $\phi c$.

In this case, a command value of the primary magnetic flux $\lambda 1$ (hereinafter, referred to as a "primary magnetic flux command value") has a $\delta c$-axis component $\Lambda \delta^*$, and a $\gamma c$-axis component is zero. Therefore, when the primary magnetic flux $\lambda 1$ is equal to the primary magnetic flux command value, the $\delta c$-axis component $\lambda 1 \delta c$ of the primary magnetic flux $\lambda 1$ is equal to the $\delta c$-axis component $\Lambda \delta^*$, the phase difference $\phi c$ is equal to the load angle $\phi$, and the $\delta c$ axis is coincident with the $\delta$ axis.

The $\delta c$-axis component $\lambda 1 \delta c$ and the $\gamma c$-axis component $\lambda 1 \gamma c$ of the primary magnetic flux $\lambda 1$ vary with a change of the primary magnetic flux command value, a variation in a load, an influence of control disturbance, or/and the like. For example, the change of the primary magnetic flux command value and the variation in the load invites a transient change of the primary magnetic flux $\lambda 1$, and the control disturbance invites a variation in the $\gamma c$ axis/$\delta c$ axis. As states where the control disturbance occurs, for example, a state where a voltage applied to the rotary electric motor is different from a voltage command due to an influence of a time delay, an on-loss, and dead time, and a state where there is a deviation between a device constant of the rotary electric motor and that assumed by a control system. Therefore, a deviation arises between the primary magnetic flux $\lambda 1$ and the primary magnetic flux command value, and accordingly a deviation also arises between the load angle $\phi$ and the phase difference $\phi c$.

In the primary magnetic flux control, when there is a deviation between the primary magnetic flux $\lambda 1$ and the primary magnetic flux command value, a control, for example, of a voltage command value to be corrected is performed so that the $\delta c$-axis component $\lambda 1 \delta c$ of the primary magnetic flux $\lambda 1$ may be made equal to the $\delta c$-axis component $\Lambda \delta^*$ of the primary magnetic flux command value and the $\gamma c$-axis component $\lambda 1 \gamma c$ of the primary magnetic flux $\lambda 1$ may become zero. The phase difference $\phi c$ is thereby coincident with the load angle $\phi$.

In such a primary magnetic flux control, control is made with a torque of the rotary electric motor being made in direct proportion to a $\gamma c$-axis component of an armature current, not depending on a rotation angular velocity thereof.

Among the following prior-art documents, in Yabe and Sakanobe, "A Sensor-less Drive of IPM Motor with Over-modulation PWM", The papers of Joint Technical Meeting on Rotating Machinery, IEE Japan, 2001 (159), pp. 7 to 12, the $\gamma c$ axis and the $\delta c$ axis are exchanged and employed, as compared with those in the other prior-art documents.

SUMMARY

Problems to be Solved

In Japanese Patent No. 3672761, a feedback is achieved by using a deviation in a $\delta$-axis component, not by using a $\gamma$-axis component of the armature current. Further, in Kaku, Yamamura, and Tsunehiro, "A Novel Technique for a DC Brushless Motor Having No Position-Sensors", IEEJ Transaction on Industry Applications, 1991, Volume 111, No. 8, pp. 639 to 644, assumed is a range in which the load angle $\phi$ can equally approximate a sine value sin $\phi$ thereof.

In any one of the above documents, however, except Yabe and Sakanobe, "A Sensor-less Drive of IPM Motor with Over-modulation PWM", The papers of Joint Technical Meeting on Rotating Machinery, IEE Japan, 2001 (159), pp. 7 to 12, with respect to an inductance of the armature winding, a d-axis component thereof and a $\gamma$-axis component which is 90-degree phase advance therewith are handled isotropically, and the technique cannot be applied to a rotary electric motor having so-called saliency such as an interior permanent magnet rotary electric motor.

Further, the amount of feedbacks employed in any one of the prior-art documents does not include any information of the load angle $\phi$. For example, a $\delta$-axis current and a $\gamma$-axis current are employed in Japanese Patent Application Laid Open Gazette No. 4-91693 and Hotta, Asano, and Tsunehiro, "Method of controlling Position Sensorless DC brushless motor", 1988 Tokai-Section Joint Conference of the Institutes of Electrical and Related Engineers, p. 161, Kaku and Tsunehiro, "A Novel Technique for a DC Brushless Motor Having No Position-Sensors", 1990 Tokai-Section Joint Conference of the Institutes of Electrical and Engineers, p. 172, Kaku, Yamamura, and Tsunehiro, "A Novel Technique for a DC Brushless Motor Having No Position-Sensors", IEEJ Transaction on Industry Applications, 1991, Volume 111, No. 8, pp. 639 to 644, and Yabe and Sakanobe, "A Sensor-less Drive of IPM Motor with Over-modulation PWM", The papers of Joint Technical Meeting on Rotating Machinery, IEE Japan, 2001 (159), pp. 7 to 12 and the $\delta$-axis current is employed in Japanese Patent No. 3672761 and Urita, Tsukamoto, and Tsunehiro, "Constant estimation method for synchronous machines with the primary magnetic flux controlled", 1998 Tokai-Section Joint Conference of the Institutes of Electrical Engineers, p. 101 and Urita, Yamamura, and Tsunehiro, "On General Purpose Inverter for Synchronous Motor Drive", IEEJ Transaction on Industry Applications, 1999, Volume 119, No. 5, pp. 707 to 712, respectively, for the amount of feedbacks. For this reason, in an area where the load angle $\phi$ is large, the primary magnetic flux cannot be controlled to a desired value. When a large torque is outputted, the load angle $\phi$ also becomes large.

Therefore, in the conventional primary magnetic flux control, it is hard to appropriately perform a stable drive or a high-efficient drive in the area where the torque is large.

In order to solve the above problem, a technique is described to apply the primary magnetic flux control to the rotary electric motor even having saliency by performing a feedback based on the deviation of the primary magnetic flux. Also described is a technique to provide a primary magnetic flux control in which a drive can be performed at a stable and high-efficient operating point even in an area where an output torque is large.

Means for Solving the Problems

An electric motor controller according to the present disclosure is a device for controlling a primary magnetic flux ($[\lambda 1]$) on a rotary electric motor including an armature having an armature winding and a rotor which is a field rotating relatively to the armature, the primary magnetic flux being a synthesis of a field flux ($\Lambda 0$) that the field generates and a magnetic flux ($\lambda a$: $id \cdot Ld$, $iq \cdot Lq$) of an armature reaction generated by an armature current ($[I]$) flowing in the armature.

A first aspect of the electric motor controller according to the present disclosure includes a first coordinate conversion unit (101) that converts the armature current into a first current ($[i]$) in a rotating coordinate system ($\delta c$-$\gamma c$) having a predetermined phase ($\phi c$) with respect to rotation of the rotor, a first calculation unit (102) that sums an inductive voltage ($\omega^* \cdot [\Lambda 1^*]$) by a primary magnetic flux command value ($[\Lambda 1^*]$) which is a command value of the primary magnetic flux and a voltage drop ($\{R\}[i]$) by the first current on the basis of a voltage equation at a time when the rotary electric motor to obtain a first term ($[F]$), a second calculation unit (103A, 103B) that sums said first term and a second term ($[B]$) obtained by performing an operation expressed by a non-zero matrix ($\{K\}$) on a deviation ($[\Delta\Lambda]$) of the primary magnetic flux with respect to the primary magnetic flux command value to obtain a first voltage command value ($[v^*]$) which is a command value of a voltage to be applied to the rotary electric motor in the rotating coordinate system, and a second coordinate conversion unit (104) that coordinate-converts the first voltage command value into a second voltage command value ($[V^*]$) which is a command value of the voltage to be applied to the rotary electric motor in another coordinate system.

A second aspect of the electric motor controller according to the present disclosure is the first aspect thereof in which the second calculation unit (103A) employs an estimation value ($[\lambda 1^\wedge]$) of the primary magnetic flux as the primary magnetic flux.

A third aspect of the electric motor controller according to the present disclosure, which is the second aspect thereof, further includes a primary magnetic flux estimation unit (105) that obtains the estimation value ($[\lambda 1^\wedge]$) of the primary magnetic flux from the predetermined phase ($\phi c$), a first component (Lq) orthogonal to the field flux of an inductance of the armature winding, a second component (Ld) in phase with the field flux of the inductance, the first current, and the field flux ($\Lambda 0$).

A fourth aspect of the electric motor controller according to the present disclosure, which is the second or third aspect thereof, further includes a primary magnetic flux command correction unit (107) that corrects the primary magnetic flux command value ($[\Lambda 1^*]$) to output a primary magnetic flux command correction value ($[\Lambda 1^{}]$) by using the predetermined phase ($\phi c$), a first component (Lq) orthogonal to the field flux of an inductance of the armature winding, a second component (Ld) in phase with the field flux of the inductance, the first current, the field flux ($\Lambda 0$), and the estimation value ($[\lambda 1^\wedge]$) of the primary magnetic flux. The second calculation unit (103B**) employs the primary magnetic flux command correction value as the primary magnetic flux command value.

An estimation value of the predetermined phase may be employed as the predetermined phase. For example, the predetermined phase ($\phi c$) is obtained from the first voltage command value ($[v^*]$), a resistance value ($\{R\}$) of the armature winding, the first component (Lq), a rotation angular velocity ($\omega^*$) of the rotor, and the first current ($[i]$).

Effects

In the electric motor controller of the first aspect according to the present disclosure, since the second term obtained on the basis of the deviation of the primary magnetic flux functions as a feedback for the first voltage command value, the second term has information of a load angle, and even when the deviation between the predetermined phase and the load angle is large, it becomes easier to perform the primary magnetic flux control while correcting the deviation. Further, the primary magnetic flux control does not depend on whether or not there is saliency.

In the electric motor controller of the second aspect according to the present disclosure, it is not necessary to perform a direct detection of the primary magnetic flux.

In the electric motor controller of the third aspect according to the present disclosure, it is possible to perform the primary magnetic flux control while correcting the deviation of the load angle regardless of whether or not there is saliency.

In the electric motor controller of the fourth aspect according to the present disclosure, it is possible to achieve accuracy on the same level with the second or third aspect, regardless of a method of detecting or estimating the primary magnetic flux.

These and other objects, features, aspects and advantages of the present disclosure will become more apparent from the following detailed description of the present disclosure when taken in conjunction with the accompanying drawings.

BRIEF DESCRIPTION OF DRAWINGS

FIGS. 9 and 10 are block diagrams illustrating a third preferred embodiment.

DESCRIPTION OF EMBODIMENTS

In the following embodiments, description will be made with a three-phase interior permanent magnet rotary electric motor taken an example. It is obvious that a rotary electric motor of polyphase, other than three-phase, as well as a rotary electric motor other than an interior permanent magnet type is also applicable.

The First Preferred Embodiment

Figure 1:
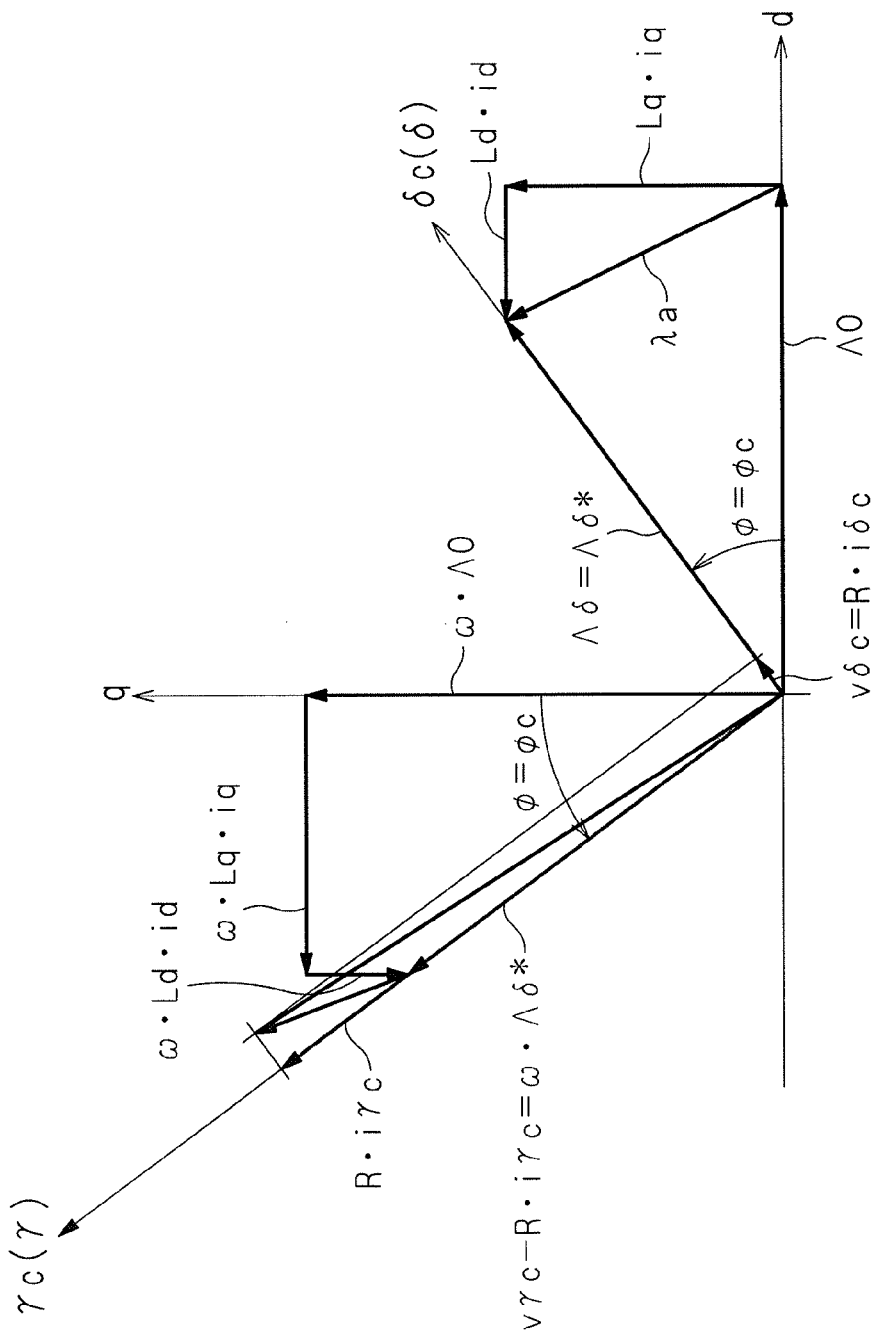
FIGS. 1 to 3 are vector diagrams illustrating a first preferred embodiment.
Figure 2:
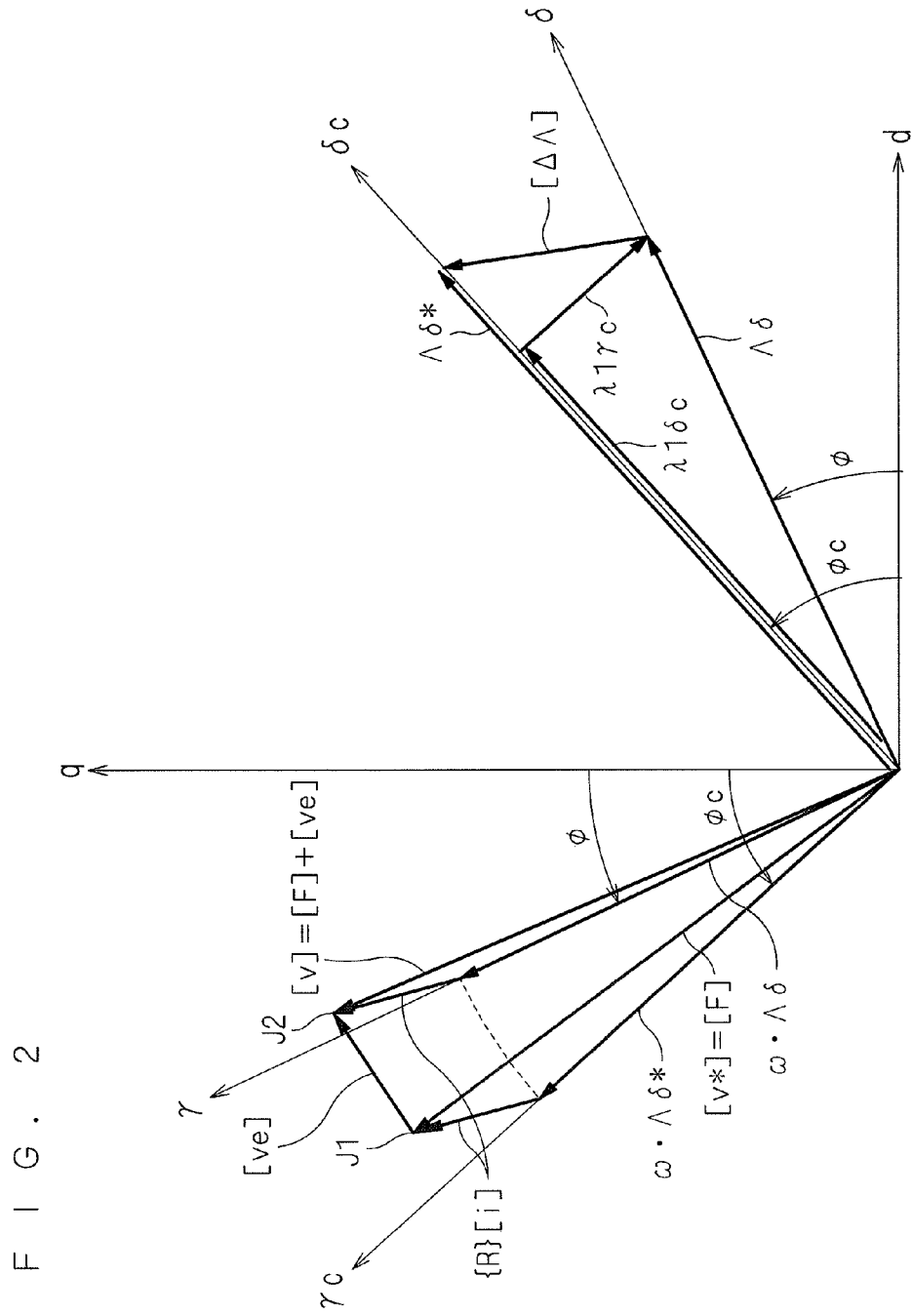

FIGS. 1 and 2 are vector diagrams each illustrating a primary magnetic flux control.

In the primary magnetic flux control, set is a $\delta c$-$\gamma c$ coordinate system which is in phase advance with a d-q coordinate system (a d axis in phase with a field flux $\Lambda 0$, a q axis is in 90-degree phase advance with the d axis) with reference to a phase of the field flux $\Lambda 0$ (i.e. with the rotation of a rotor), by a phase difference $\phi c$. Then, a voltage to be applied to the rotary electric motor (a $\gamma c$-axis component and a $\delta c$-axis component thereof are assumed to be $v\gamma c$ and $v\delta c$, respectively) is adjusted so that a $\delta c$ axis may be coincident with a $\delta$ axis, which is in phase with the primary magnetic flux.

First, FIG. 1 shows a case where the phase difference $\phi c$ is coincident with the load angle $\phi$. As shown in FIG. 1, a magnetic flux $\lambda a$ of an armature reaction is a synthesis of a magnetic flux $Lq \cdot iq$ in a q-axis positive direction and a magnetic flux $Ld \cdot id$ in a d-axis negative direction. Then, the primary magnetic flux is a synthesis of the magnetic flux $\lambda a$ and the field flux $\Lambda 0$ and takes a positive value $\Lambda \delta$ (coincident with a command value $\Lambda \delta^*$ thereof) in the $\delta$ axis (coincident with the $\delta c$ axis in FIG. 1).

An inductive voltage $\omega \cdot \Lambda \delta (=\omega \cdot \Lambda \delta^*)$ by the primary magnetic flux appears on a $\gamma c$ axis (herein, coincident with a $\gamma$ axis). Further, for explanatory convenience, when it is grasped that the inductive voltage $\omega \cdot \Lambda 0$ in a case where the armature reaction is disregarded (in other words, it is assumed that the magnetic flux $\lambda a=0$) is an inductive voltage by the field flux, the inductive voltage $\omega \cdot \Lambda 0$ appears on the q axis.

Therefore, the inductive voltage by the armature reaction is represented as a synthesis of a voltage $\omega \cdot Lq \cdot iq$ in the d-axis negative direction and a voltage $\omega \cdot Ld \cdot id$ in a q-axis negative direction.

Introducing a resistance value R of an armature winding, a voltage drop by an armature current appears as a voltage $R \cdot i\delta c$ on the $\delta c$ axis and as a voltage $R \cdot i\gamma c$ on the $\gamma c$ axis.

Therefore, assuming that the $\gamma c$-axis component and the $\delta c$-axis component of the voltage to be applied to the rotary electric motor are a voltage $v\gamma c$ and a voltage $v\delta c$, respectively, when the primary magnetic flux is coincident with the primary magnetic flux command value, $v\gamma c - R \cdot i\gamma c = \omega \cdot \Lambda \delta^*$, $v\delta c = R \cdot i\delta c$ are true, as shown in FIG. 1.

Now, the $\delta c$-axis component $\lambda 1 \delta c$ and/or the $\gamma c$-axis component $\lambda 1 \gamma c$ of the primary magnetic flux $\lambda 1$ vary with a variation in the load, an influence of control disturbance, or/and the like. Therefore, as shown in FIG. 2, a deviation arises between the phase difference $\phi c$ and the load angle $\phi$. From the definition of the $\delta$ axis, since the primary magnetic has no $\gamma$-axis component, the primary magnetic flux which actually occurs is also referred to as a primary magnetic flux $\Lambda \delta$.

In the $\delta c$-$\gamma c$ rotating coordinate system on which the primary magnetic flux control is performed, a control is made so that the $\delta c$-axis component $\lambda 1 \delta c$ of the primary magnetic flux $\Lambda \delta$ may be coincident with (a $\delta c$-axis component $\Lambda \delta^*$ of) the primary magnetic flux command value and the $\gamma c$-axis component $\lambda 1 \gamma c$ of the primary magnetic flux $\Lambda \delta$ may be coincident with (a $\gamma c$-axis component $\Lambda \gamma^*=0$ of) the primary magnetic flux command value.

In order to make the $\delta c$-axis component $\lambda 1 \delta c$ coincident with the $\delta c$-axis component $\Lambda \delta^*$ of the primary magnetic flux command value, the inductive voltage $\omega \cdot \Lambda \delta^*$ on the $\gamma c$ axis needs to appear. Also in consideration of the voltage drop in the armature winding, it is necessary to set the voltage command value as a sum of the inductive voltage $\omega \cdot \Lambda \delta^*$ and the voltage drop. Herein, the sum is represented as a feedforward term $[F]=[F\gamma F\delta]^t$ (the former component represents the $\gamma c$-axis component and the latter component represents the $\delta c$-axis component: the superscript "t" represents a transpose of a matrix: the same applies to the following unless otherwise indicated). Eqs. (1) and (2) are derived from a voltage equation of a rotary electric motor, where a differential operator p is introduced.

$$[F] = \{R\}[i] + \begin{Bmatrix} p & \omega^* \\ -\omega^* & p \end{Bmatrix} [\Lambda 1 *] \quad (1)$$

$$\begin{bmatrix} F\gamma \\ F\delta \end{bmatrix} = \begin{Bmatrix} R & 0 \\ 0 & R \end{Bmatrix} \begin{bmatrix} i\gamma c \\ i\delta c \end{bmatrix} + \begin{bmatrix} \omega^* \cdot \Lambda \delta^* \\ 0 \end{bmatrix} + \begin{bmatrix} 0 \\ p \cdot \Lambda \delta^* \end{bmatrix} \quad (2)$$

In Eq. (1), it can be grasped that a matrix $\{R\}$ is a tensor indicating a resistance of the armature winding, and as shown in Eq. (2), the matrix $\{R\}$ has the same component R both on the $\delta c$ axis and the $\gamma c$ axis and off-diagonal components are zeros. Further, a current vector $[i]=[i\gamma c \, i\delta c]^t$ indicating a current flowing the armature winding is introduced. The first term on the right side of each of Eqs. (1) and (2) represents a voltage drop $\{R\}[i]$. The third term of Eq. (2) is a transient term and can be disregarded. This is because an influence of the transient term can be also handled as the deviation between the load angle $\phi$ and the phase difference $\phi c$, as described above.

Further, assuming herein that both the $\delta c$ axis and the $\delta$ axis rotate with respect to the d axis at an angular velocity $\omega$ which is equal to a command value $\omega^*$ of the angular velocity, $\omega=\omega^*$. By appropriately performing the primary magnetic flux control, $\omega=\omega^*$ is true.

When the phase difference $\phi c$ is equal to the load angle $\phi$, since the $\delta c$-axis component $\Lambda \delta^*$ of the primary magnetic flux command value $[\Lambda 1^*]=[0 \, \Lambda \delta^*]^t$ in the $\delta c$-$\gamma c$ rotating coordinate system is coincident with the primary magnetic flux $\Lambda \delta$, the feedforward term [F] is the voltage command value $[v^*]$ for the rotary electric motor (also see FIG. 1).

When the $\gamma$ axis is not coincident with the $\gamma c$ axis, however, the phase ($\phi c - \phi$) is not resolved only by employing only the feedforward term [F] as the voltage command value. In the primary magnetic flux control, since no control is made on the basis of the deviation with respect to the voltage command value $[v^*]$ of the voltage $[v]$ to be applied to the rotary electric motor, a voltage deviation $[ve]=[v]-[v^*]$ arises. The phase difference ($\phi c - \phi$) thereby remains. Therefore, in order to resolve the phase difference ($\phi c - \phi$) (in order to make $\phi c = \phi$), as the voltage command value $[v^*]=[v\gamma c^* v\delta c^*]^t$ to be determined with respect to the primary magnetic flux $\Lambda \delta$, a vector represented at a position obtained by rotationally transfer the feedforward term [F] represented at a position J1 to be in phase advance by the phase difference ($\phi c - \phi$) (in the counterclockwise direction in FIG. 2) should be employed. This is because only with the feedforward term [F], a voltage [v] arises at a position in phase lag with the voltage command value $[v^*]$ by the phase difference ($\phi c - \phi$).

The matrix operation of such rotational transfer of the vector, however, cannot be performed. This is because the load angle φ which actually arises is not known.

As is clear from FIG. 2, the difference between the positions J1 and J2 is caused by the difference [ΔΛ]=[0−λ1γc Λδ*−λ1δc]$^t$ between the magnetic flux in the primary magnetic flux control, which takes the primary magnetic flux command value Λδ* in the δc-γc rotating coordinate system (on the δc axis), and the primary magnetic flux Λδ which actually arises in a δ-γ rotating coordinate system (on the δ axis). The difference is grasped, by the substances thereof, as the deviation of the primary magnetic flux with respect to the primary magnetic flux command value.

Therefore, by calculating the voltage command value [v*] with the sum of the feedback term [B]=[Bγ Bδ]$^t$ and the feedforward term [F] (see FIG. 3), in spite of the presence of the voltage deviation [ve], it is possible to reduce the difference between the feedforward term [F] and the voltage [v]. Now, the feedback term [B], however, can be obtained by Eqs. (3) and (4).

$$[B] = \{K\}[\Delta\Lambda] \quad (3)$$

$$\begin{bmatrix} B\gamma \\ B\delta \end{bmatrix} = \begin{Bmatrix} K\gamma\gamma & K\gamma\delta \\ K\delta\gamma & K\delta\delta \end{Bmatrix} \begin{bmatrix} -\lambda 1\gamma c \\ \Lambda\delta^* - \lambda 1\delta c \end{bmatrix} \quad (4)$$

At least one of components Kγγ, Kγδ, Kδγ, and Kδδ in a matrix {K} for performing an arithmetic operation on the deviation [ΔΛ] of the magnetic flux is not zero. In other words, the matrix {K} is a non-zero matrix.

The feedforward term [F] functions as a feedforward based on the armature current and the feedback term [B] functions as a feedback based on the deviation of the magnetic flux.

When both the two elements of a column vector [Kγγ Kδγ]$^t$ forming the matrix {K} are not zero, for example, the γc-axis component (−λ1γc) of the deviation of the magnetic flux can be fed back to the voltage command value [v*] with respect to both the γc axis and the δc axis. Alternatively, when both the two elements of a column vector [Kγδ Kδδ]$^t$ are not zero, the δc-axis component (Λδ*−λ1δc) of the deviation of the magnetic flux can be fed back to the voltage command value [v*] with respect to both the γc axis and the δc axis.

Further, when both the column vectors [Kγγ Kδγ]$^t$ and [Kγδ Kδδ]$^t$ are non-zero vectors, the magnetic flux component of both axes can be fed back, and it is therefore possible to improve stability and responsibility of the control system.

Figure 3:
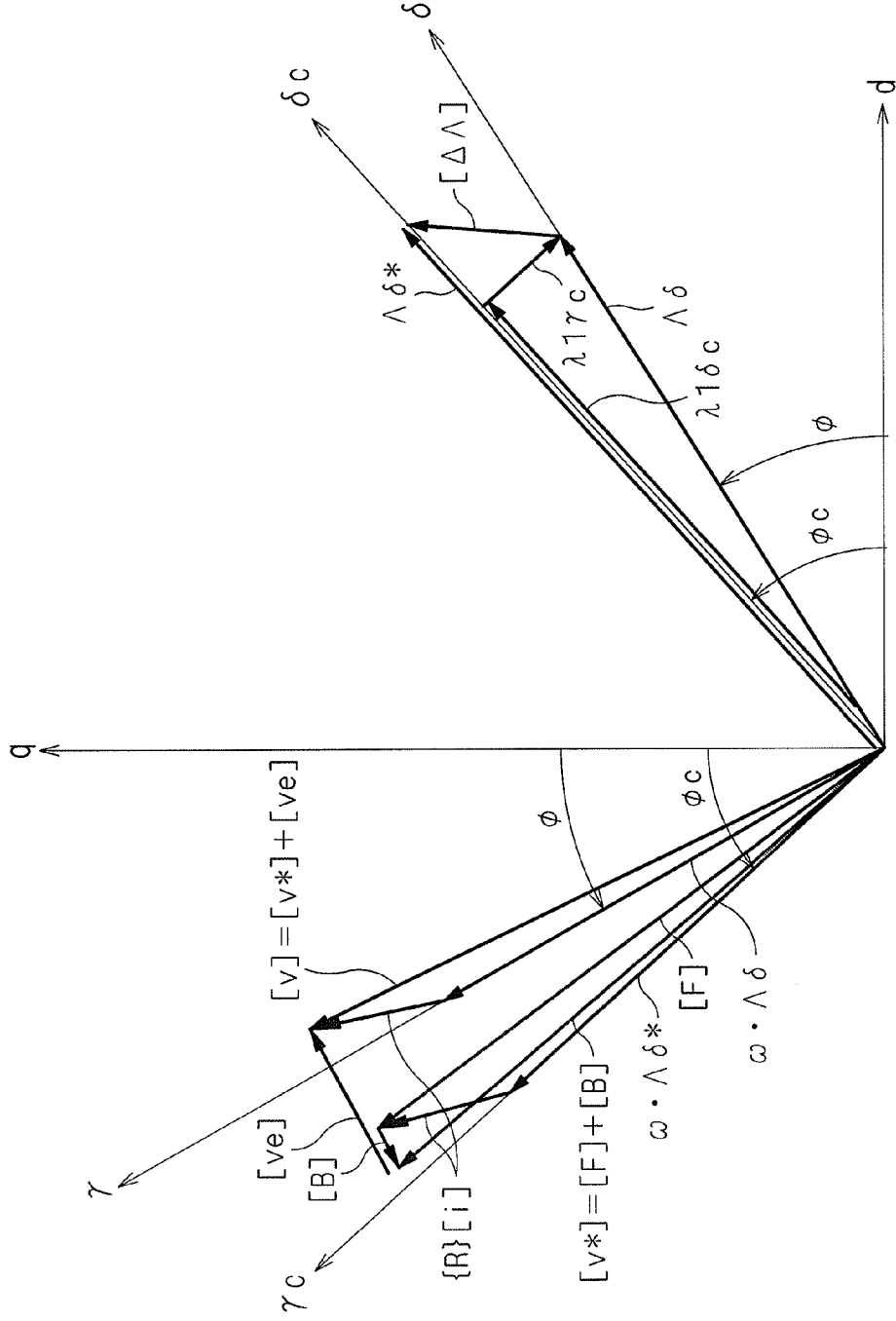

Since the feedback term [B] functions as the feedback based on the deviation [ΔΛ] with respect to the voltage command value, if the phase difference φc deviates with respect to the load angle φ, it becomes easier to perform the primary magnetic flux control by correcting the deviation. In conformity with FIG. 3, the deviation [ΔΛ] decreases, the phase difference φc approximates the load angle φ, and the γc axis approximates the γ axis. Then, when such a feedback proceeds and the γc axis becomes coincident with the γ axis, λ1γc=0 and λ1δc=Λδ*, and the state shown in FIG. 1 is achieved. In other words, FIG. 3 is a vector diagram showing a condition while the phase difference φc approximates the load angle φ.

As is clear from Eq. (4), the voltage command value can be determined in consideration of the feedback based on the deviation [ΔΛ] of the primary magnetic flux. The matrix {K} functioning as a feedback gain may or may not have a diagonal component or an off-diagonal component only if the matrix {K} is a non-zero matrix. Further, each component may include an integral element.

Figure 4:
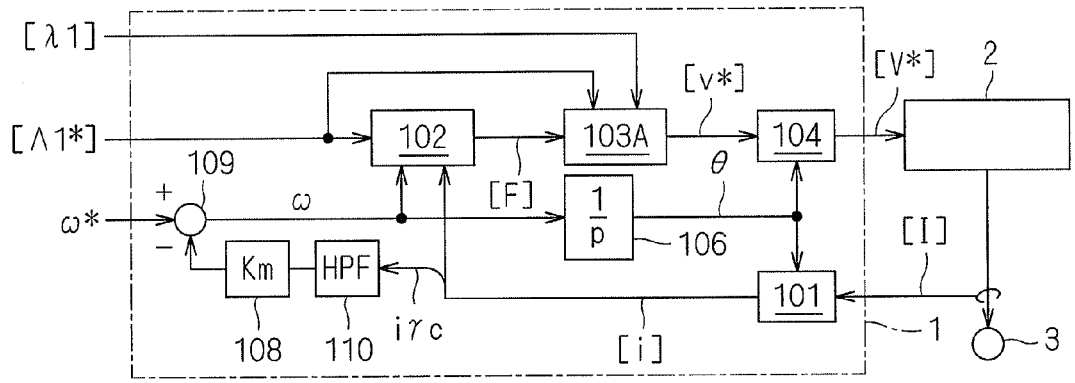
FIGS. 4 and 5 are block diagrams illustrating the first preferred embodiment.

On the basis of the above idea, FIG. 4 is a block diagram showing a configuration of an electric motor controller 1 in accordance with the present embodiment and its peripheral devices.

A rotary electric motor 3 is a three-phase electric motor, and includes a not-shown armature and a rotor which is a field. As a technical common sense, the armature has an armature winding and the rotor rotates relatively to the armature. The field includes, for example, a magnet which generates a field flux. Herein, description will be made on a case where an interior permanent magnet type is adopted.

A voltage supply source 2 includes, for example, a voltage control type inverter and a control unit thereof, and applies a three-phase voltage to the rotary electric motor 3 on the basis of a three-phase voltage command value [V*]= [Vu*Vv*Vw*]$^t$. A three-phase current [I]=[Iu Iv Iw]$^t$ thereby flows in the rotary electric motor 3. The components which the voltage command value [V*] and the three-phase current [I] have are, for example, described as a U-phase component, a V-phase component, and a W-phase component in this order.

The electric motor controller 1 is a device for controlling the primary magnetic flux [λ1] and the rotation velocity (hereinafter, illustrated as the rotation angular velocity) on the rotary electric motor 3. The primary magnetic flux [λ1] is a synthesis of the field flux Λ0 that a field magnet generates and the magnetic flux λa (see the components of FIG. 1, id·Ld, iq·Lq in FIG. 1) of the armature reaction generated by the armature current (this is also the three-phase current [I]) flowing in the armature. The magnitude of the primary magnetic flux [λ1] is a component Λδ on the actual δ axis, and is represented as [λ1]=[λ1γcλ1δc]$^t$ in the δc-γc rotating coordinate system. In the present embodiment, the primary magnetic flux [λ1] is handled as an observable value or an already-estimated value.

The electric motor controller 1 includes a first coordinate conversion unit 101, a first calculation unit 102, a second calculation unit, 103A, a second coordinate conversion unit 104, and an integrator 106.

The first coordinate conversion unit 101 converts the three-phase current [I] into a current [i] in the δc-γc rotating coordinate system where the primary magnetic flux control is performed.

The first calculation unit 102 obtains the feedforward term [F]. The second calculation unit 103A obtains the voltage command value [v*] in the δc-γc rotating coordinate system as a sum of the feedforward term [F] and the feedback term [B].

The second coordinate conversion unit 104 performs a coordinate conversion of the voltage command value [v*] into a voltage command value [V*] of a voltage to be applied to the rotary electric motor 3 in another coordinate system. This "another coordinate system" may be, for example, a d-q rotating coordinate system, an α-β fixed coordinate system (for example, the α-axis is set in phase with the U phase), or a uvw fixed coordinate system, or a polar coordinate system. Which one of the coordinate systems is employed as "another coordinate system" depends on which control the voltage supply source 2 performs. For example, when the voltage command value [V*] is set in the d-q rotating coordinate system, [V*]=[Vd*Vq*]$^t$ (where the former component is the d-axis component and the latter component is the q-axis component).

The integrator 106 calculates a phase θ of the δc axis with respect to the α axis on the basis of the rotation angular velocity ω. On the basis of the phase θ, the first coordinate conversion unit 101 and the second coordinate conversion unit 104 can perform the above coordinate conversion. The rotation angular velocity ω is obtained as an output of a subtracter 109. The rotation angular velocity ω is obtained by subtracting a Km times multipled value, in a constant multiplier unit 108, of the γc-axis component iγc of the current [i] that has been removed its DC component in a high pass filter 110, from a command value ω* of the rotation angular velocity in a subtracter 109. When the primary magnetic flux control is appropriately performed, ω=ω* as described above.

Figure 5:
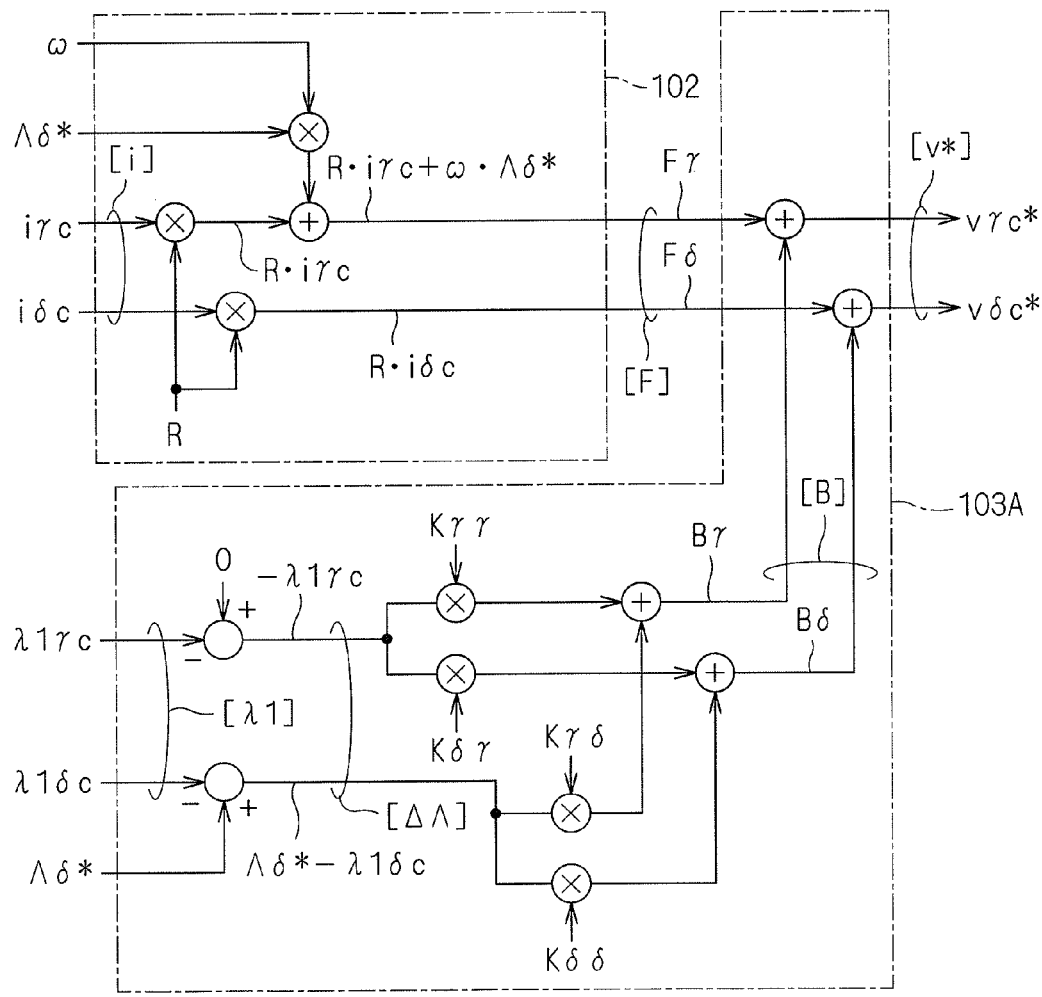

FIG. 5 is a block diagram showing configurations of the first calculation unit 102 and the second calculation unit 103A. In FIG. 5, a reference sign "x" surrounded by a circle represents a multiplier, a reference sign "+" surrounded by a circle represents an adder, and a circle to which reference signs "+−" are attached represents a subtracter. Since the resistance value R, the primary magnetic flux command value Λδ*=0 on the γc axis, feedback gains Kγγ, Kγδ, Kδγ, and Kδδ are already known, these can be set in the first calculation unit 102 and the second calculation unit 103A.

The Second Embodiment

The present embodiment shows a technique in which the electric motor controller 1 obtains an estimation value [λ1^] of the primary magnetic flux [λ1].

Figure 6:
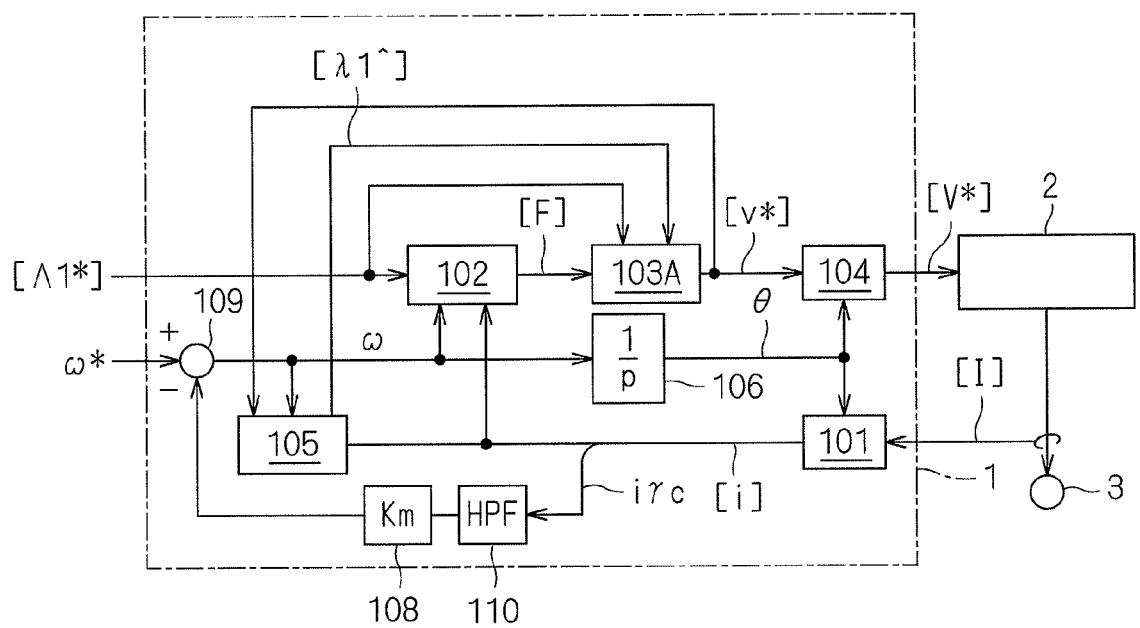
FIG. 6 is a block diagram illustrating a second preferred embodiment.

As shown in FIG. 6, the configuration of the electric motor controller 1 of the present embodiment further includes a primary magnetic flux estimation unit 105 in that of the electric motor controller 1 of the first embodiment. As the primary magnetic flux [λ1], the second calculation unit 103A employs the estimation value [λ1^] thereof.

In general, the phase of the field flux Λ0 is employed on the d axis, and a q axis which is in 90-degree phase advance therewith is assumed. When such a d-q rotating coordinate system rotates at the angular velocity ω, introducing a d-axis voltage vd which is a d-axis component of the voltage to be applied to the rotary electric motor, a q-axis voltage vq which is a q-axis component of the voltage to be applied to the rotary electric motor, a d-axis inductance Ld which is a d-axis component of the inductance of the armature winding, a q-axis inductance Lq which is a q-axis component of the inductance of the armature winding, and the differential operator p, Eq. (5) is held.

$$\begin{bmatrix} vd \\ vq \end{bmatrix} = \left\{ \begin{matrix} R+p\cdot Ld & -\omega\cdot Lq \\ \omega\cdot Ld & R+p\cdot Lq \end{matrix} \right\} \begin{bmatrix} id \\ iq \end{bmatrix} + \begin{bmatrix} 0 \\ \omega\cdot\Lambda 0 \end{bmatrix} \quad (5)$$

The above equation is expressed in a ξ-η rotating coordinate system having a ξ axis rotating while maintaining the phase difference ψ with respect to the d axis and a η axis in 90-degree phase advance with the ι axis, the following Eqs. (6), (7), and (8) are held. Note that introduced are a ξ-axis component iξ of the armature current, a η-axis component iη of the armature current, a ξ-axis component vξ and a η-axis component vη of the voltage to be applied to the rotary electric motor, and a ξ-axis component λξ and a η-axis component λη of the primary magnetic flux. Herein, it is not assumed that the primary magnetic flux control is performed.

$$\begin{bmatrix} v\eta \\ v\xi \end{bmatrix} = \left\{ \begin{matrix} R & 0 \\ 0 & R \end{matrix} \right\} \begin{bmatrix} i & \eta \\ i & \xi \end{bmatrix} + \left\{ \begin{matrix} p & \omega \\ -\omega & p \end{matrix} \right\} \begin{bmatrix} \lambda & \eta \\ \lambda & \xi \end{bmatrix} \quad (6)$$

$$\begin{bmatrix} \lambda & \xi \\ -\lambda & \eta \end{bmatrix} = \left\{ \begin{matrix} (Lq-Ld)\sin\psi\cdot\cos\psi & Ld\cdot\cos^2\psi+Lq\cdot\sin^2\psi \\ -Ld\cdot\sin^2\psi-Lq\cdot\cos^2\psi & -(Lq-Ld)\sin\psi\cdot\cos\psi \end{matrix} \right\} \quad (7)$$

$$\begin{bmatrix} i & \eta \\ i & \xi \end{bmatrix} + \begin{bmatrix} \Lambda 0\cdot\cos\psi \\ \Lambda 0\cdot\sin\psi \end{bmatrix}$$

$$\tan\psi = \frac{v\xi - R\cdot i\xi + \omega\cdot Lq\cdot i\eta}{v\eta - R\cdot i\eta - \omega\cdot Lq\cdot i\xi} \quad (8)$$

The first term on the right side of Eq. (7) is a magnetic flux (armature reaction) generated by the armature current flow, and the second term thereof is a magnetic flux contributing to the field flux Λ0.

Figure 7:
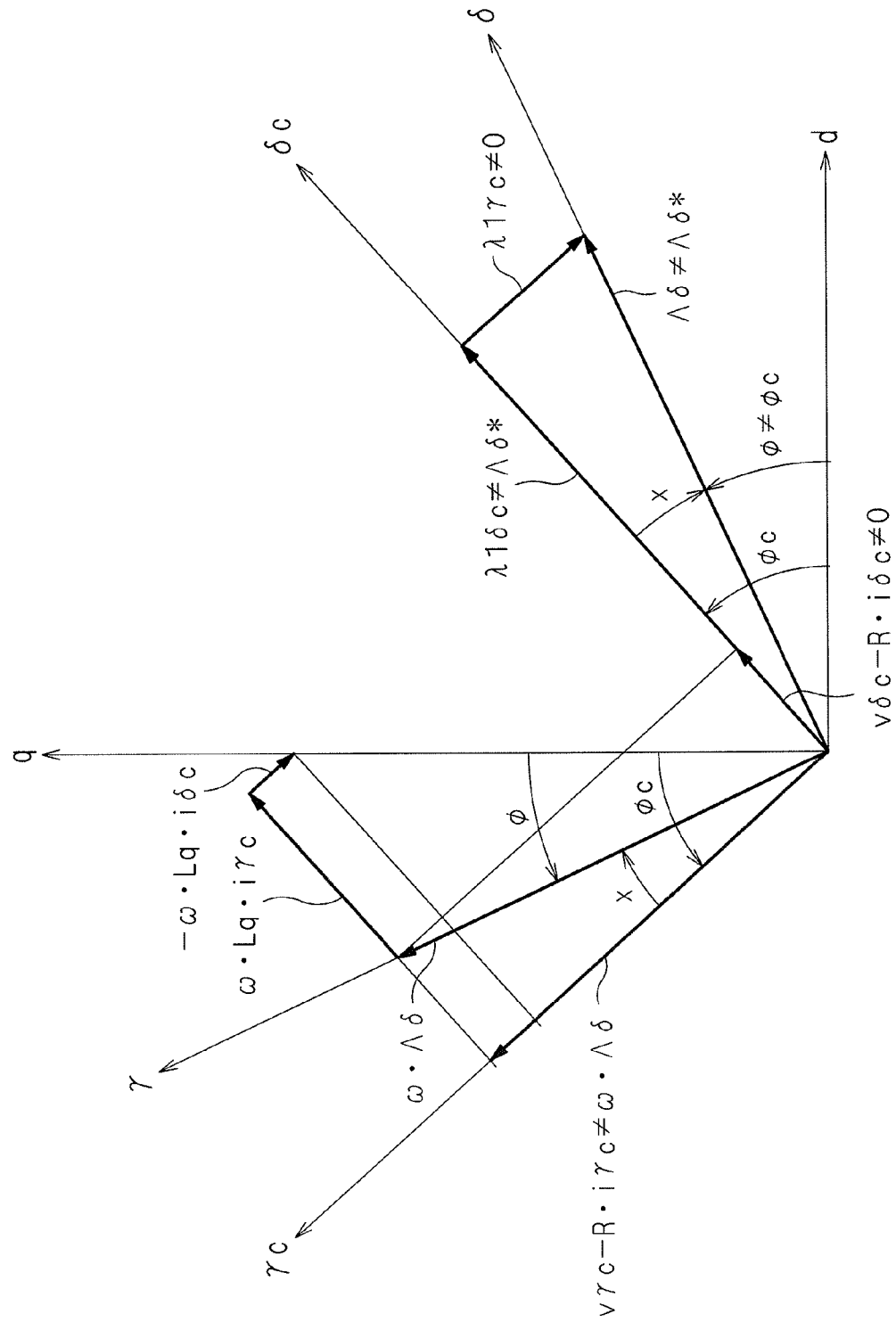
FIG. 7 is a vector diagram illustrating the second preferred embodiment.

Since the Eqs. (6), (7), and (8) are held regardless of the phase difference ψ, if the phase difference ψ is replaced with the phase difference φc, in other words, the ξ-η rotating coordinate system is replaced with the δc-γc rotating coordinate system, the meanings of Eqs. (6), (7), and (8) are not changed. Since a phase of the actual primary magnetic flux Λδ having the load angle φ with respect to the d axis is taken on the δ axis, with the above replacement, the value λξ represents the δc-axis component λ1δc of the primary magnetic flux Λδ and the value λη represents the γc-axis component λ1γc of the primary magnetic flux Λδ in Eq. (7). The vector diagram at that time is shown in FIG. 7.

Therefore, from the phase difference φc, the d-axis inductance Ld, the q-axis inductance Lq, the armature currents iγc and iδc, and the field flux Λ0, the estimation value of the primary magnetic flux [λ1], [λ1^]=[λ1γc^ λ1δc^]$^t$ is obtained by Eqs. (9) and (10).

$$[\lambda 1^\wedge] = \{L\}[i] + [\Lambda 0] \quad (9)$$

$$\begin{bmatrix} \lambda 1\gamma c^\wedge \\ \lambda 1\delta c^\wedge \end{bmatrix} = \left\{ \begin{matrix} Ld\cdot\sin^2\phi c + Lq\cdot\cos^2\phi c & (Lq-Ld)\sin\phi c\cdot\cos\phi c \\ (Lq-Ld)\sin\phi c\cdot\cos\phi c & Ld\cdot\cos^2\phi c + Lq\cdot\sin^2\phi c \end{matrix} \right\} \quad (10)$$

$$\begin{bmatrix} i & \gamma & c \\ i & \delta & c \end{bmatrix} + \begin{bmatrix} -\Lambda 0\cdot\sin\phi c \\ \Lambda 0\cdot\cos\phi c \end{bmatrix}$$

$$\phi c = \tan^{-1}\frac{v\delta c - R\cdot i\delta c + \omega\cdot Lq\cdot i\gamma c}{v\gamma c - R\cdot i\gamma c - \omega\cdot Lq\cdot i\delta c} \quad (11)$$

Herein, introduced is a field flux vector [Λ0]=[−Λ0 sin φc Λ0·cos φc]$^t$, representing the field flux Λ0 in the δc-γc rotating coordinate system.

Further, it can be grasped that a matrix {L} in Eq. (9) is a coefficient of the current vector [iγc iδc]$^t$ of the first term on the right side in Eq. (10) and a tensor in which the inductance of the armature winding s expressed in the δc-γc rotating coordinate system. When the rotary electric motor has no saliency, since Ld=Lq, as is clear from FIG. 10, the off-diagonal component of the matrix {L} is zero. In other words, Eq. (10) can be employed in the rotary electric motor having saliency.

It can be grasped that the first term on the right side of each of Eqs. (9) and (10) is the magnetic flux caused by the armature reaction.

Further, the phase difference φc can employ an estimated value on the basis of Eq. (11). In this case, the used voltages vγc and vδc may employ the already-obtained voltage command values vγc* and vδc* to be used for estimation of a new phase difference φc.

Figure 8:
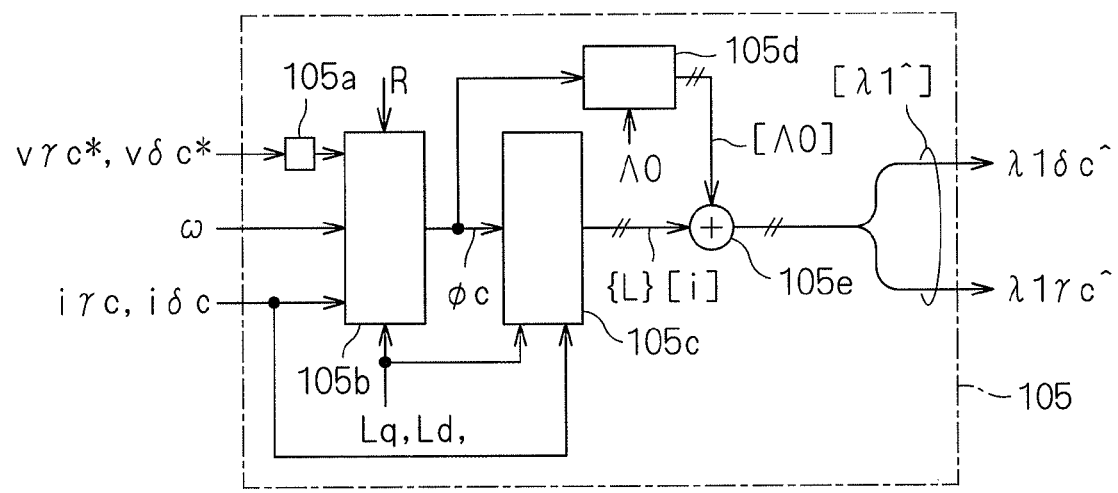
FIG. 8 is a block diagram illustrating the second preferred embodiment.

FIG. 8 is a block diagram showing a configuration of the primary magnetic flux estimation unit 105. The primary magnetic flux estimation unit 105 includes a delay unit 105a, a load angle estimating unit 105b, an armature reaction estimation unit 105c, a field flux vector generation unit 105d, and an adder 105e.

The armature reaction estimation unit 105c inputs thereto the phase difference $\phi c$, the d-axis inductance Ld, the q-axis inductance Lq, and the armature currents i$\gamma$c and i$\delta$c, and calculates the first term on the right side of Eq. (10). FIG. 8 uses the expression {L}[i] of the first term on the right side of Eq. (9), and that two values of the $\gamma$c-axis component and the $\delta$c-axis component are outputted is indicated by two slashes.

The field flux vector generation unit 105d inputs thereto the field flux $\Lambda$0 and calculates the second term on the right side of Eq. (10). FIG. 8 uses the expression [$\Lambda$0] of the second term on the right side of Eq. (9), and that two values of the $\gamma$c-axis component and the $\delta$c-axis component are outputted is indicated by two slashes.

The adder 105e performs addition in the two components, the $\gamma$c-axis component and the $\delta$c-axis component, to thereby achieve addition of the first term and the second term on the right side in each of Eqs. (9) and (10), and outputs the estimation value [$\lambda$1^] of the primary magnetic flux.

In order to estimate the phase difference $\phi c$, used are the voltage command values v$\gamma$c* and v$\delta$c* obtained by the second calculation unit 103A at the immediately preceding control timing. In other words, the delay unit 105a delays the voltage command values v$\gamma$c* and v$\delta$c* obtained by the second calculation unit 103A and the load angle estimating unit 105b calculates the phase difference $\phi c$ in accordance with Eq. (11) at the immediately following control timing. Further, instead of employing the voltage command values v$\gamma$c* and v$\delta$c* obtained at the immediately preceding control timing, the voltage command values v$\gamma$c* and v$\delta$c* which have been obtained at this point in time may be employed. In this case, the delay unit 105a may be omitted.

In the present embodiment, it is not necessary to perform direct detection of the primary magnetic flux. Further, the primary magnetic flux can be estimated, regardless of whether or not there is saliency, and the primary magnetic flux control is performed while correcting the deviation of the phase difference $\phi c$.

Thus, by performing estimation of the primary magnetic flux with the phase difference $\phi c$ which is a parameter having a strong correlation with an output torque, it is possible to estimate the primary magnetic flux with high accuracy even in the area where the output torque is large. This makes a drive of the rotary electric motor 3 stable in the area where the output torque is large, in other words, an area where the rotary electric motor 3 can be driven stably is extended. Further, even in the area where the output torque is large, the rotary electric motor 3 can be driven at a high-efficient operating point.

The Third Embodiment

In the present embodiment, shown is a technique to achieve the effect shown in the second embodiment when the electric motor controller 1 obtains the estimation value or a measured value of the primary magnetic flux [$\lambda$1].

As shown in FIG. 9, the electric motor controller 1 of the present embodiment has a constitution in which the second calculation unit 103A is replaced with a second calculation unit 103B and a primary magnetic flux command correction unit 107 is further included in the constitution of the electric motor controller 1 of the second embodiment.

Now, it is assumed that the primary magnetic flux [$\lambda$1]=[$\lambda$1$\gamma$c $\lambda$1$\delta$c]$^t$ is estimated by a method other than that shown in the second embodiment. A correction value [$\Lambda\gamma$ $\Lambda\delta$]$^t$ of the primary magnetic flux command (hereinafter, also referred to as a primary magnetic flux command correction value [$\Lambda$1**]), which satisfies the following Eq. (12) together with the primary magnetic flux [$\lambda$1], is obtained by Eq. (13). In this equation, introduced is the estimation value [$\lambda$1^] of the primary magnetic flux which is described in the second embodiment. Further, for easy understanding, a $\gamma$-axis component $\Lambda\gamma$* of the primary magnetic flux command value is also clearly specified (actually, $\Lambda\gamma$*=0).

$$\Lambda\delta^* - \lambda 1\delta c = \Lambda\delta^{**} - \lambda 1\delta c\hat{}$$

$$\Lambda\gamma^* - \lambda 1\gamma c = \Lambda\gamma^{**} - \lambda 1\gamma c\hat{} \quad (12)$$

$$\therefore \Lambda\delta^{**} = \Lambda\delta^* + \lambda 1\hat{\delta}c - \lambda 1\delta c$$

$$\Lambda\gamma^{**} = \Lambda\gamma^* + \lambda 1\hat{\gamma}c\lambda 1\gamma c \quad (13)$$

By performing the primary magnetic flux control in the second embodiment, the right side of Eq. (12) becomes zero. Therefore, when the primary magnetic flux control is performed on the primary magnetic flux [$\lambda$1] on the basis of the primary magnetic flux command correction value [$\Lambda$1**] obtained by Eq. (13), the same effect as produced in the second preferred embodiment can be achieved. In other words, it is natural that it is not necessary to perform the direct detection of the primary magnetic flux, and further, it is possible to perform the primary magnetic flux control while correcting the deviation of the phase difference $\phi c$, not depending on the method of measuring or estimating the primary magnetic flux [$\lambda$1], regardless of whether or not there is saliency.

In this case, it is not necessary to replace the primary magnetic flux command value [$\Lambda$1*] in the feedforward term [F] with the primary magnetic flux command correction value [$\Lambda$1**]. As can be understood from FIG. 2, this is because the inductive voltage $\omega$·$\Lambda\delta$* appearing on the $\gamma$c axis is determined, regardless of whether or not there is the deviation [$\Delta\Lambda$].

On the other hand, the feedback term [B] is determined on the basis of the deviation between the primary magnetic flux [$\lambda$1] and the primary magnetic flux command correction value [$\Lambda$1]. Therefore, introducing the deviation of the primary magnetic flux, [$\Delta\Lambda'$]=[$\Lambda\gamma^{}$-$\lambda$1$\gamma$c $\Lambda\delta^{**}$-$\lambda$1$\delta$c]$^t$, the feedback term [B] is obtained by the following equations.

$$[B] = \{K\}[\Delta\Lambda'] \quad (14)$$

$$\begin{bmatrix} \beta\gamma \\ \beta\delta \end{bmatrix} = \left\{ \begin{matrix} K\gamma\gamma & K\gamma\delta \\ K\delta\gamma & K\delta\delta \end{matrix} \right\} \begin{bmatrix} \Lambda\gamma^{} - \lambda 1\gamma c \\ \Lambda\delta^{} - \lambda 1\delta c \end{bmatrix} \quad (15)$$

Figure 10:
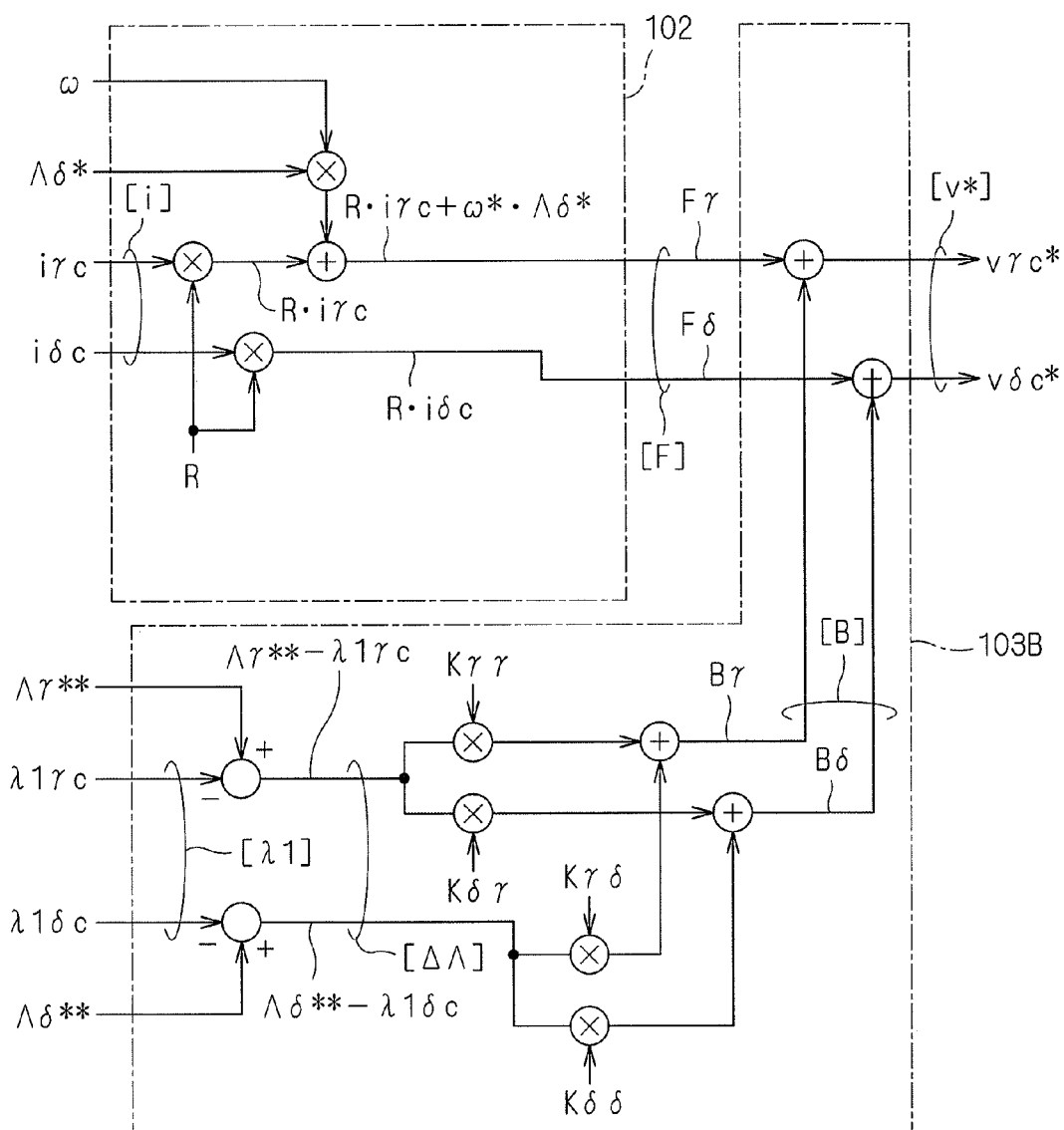

FIG. 10 is a block diagram showing a configuration of the first calculation unit 102 and a second calculation unit 103B. As described above, since the feedforward term [F] uses the primary magnetic flux command value [$\lambda$1*], instead of the primary magnetic flux command correction value [$\Lambda$1**], the first calculation unit 102 is employed also in the present embodiment, like in the first and second preferred embodiments.

On the other hand, since the calculation for obtaining the feedback term [B] uses the primary magnetic flux command correction value [$\Lambda$1**], the second calculation unit 103B has a configuration which is slightly different from that of the second calculation unit 103A. Specifically, since $\Lambda\gamma^*=0$ in the second calculation unit 103A, this is not inputted but is prepared in the second calculation unit 103A. On the other hand, in the second calculation unit 103B, the γc-axis component $\Lambda\gamma^{}$ of the primary magnetic flux command correction value [$\Lambda1^{}$] is inputted. Further, though the command value $\Lambda\delta^*$ is inputted in the second calculation unit 103A, the δc-axis component $\Lambda\delta^{}$ of the primary magnetic flux command correction value [$\Lambda1^{}$] is inputted in the second calculation unit 103B. In the configuration shown in FIG. 10, other configurations are the same as the configuration shown in FIG. 5.

The primary magnetic flux command correction unit 107 inputs thereto the primary magnetic flux command value [$\Lambda1^*$], the estimation value [$\Lambda1^\wedge$] of the primary magnetic flux (calculated by the primary magnetic flux estimation unit 105 as described in the second embodiment), and the primary magnetic flux [$\lambda1$] which is estimated by another method. Then, by performing the calculation of Eq. (13), the primary magnetic flux command correction value [$\Lambda1^{**}$] is outputted.

<Variations>

Estimations of the primary magnetic flux [$\lambda1$] by other methods other than the method shown in the second embodiment will be exemplified below.

With reference to FIG. 7, in consideration of the γc-axis component (vγc−R·iγc) and the δc-axis component (vδc−R·iδc) of an internal inductive voltage ω·Λδ, the estimation values λ1γc$^\wedge$ and λ1δc$^\wedge$ of the primary magnetic flux Λδ are obtained as −(vδc−R iδc)/ω and (vγc−R·iγc)/ω, respectively.

Further, when the estimation value Λδ$^\wedge$ of the primary magnetic flux Λδ is obtained, with reference to FIG. 7, setting χ=φ−φc, an estimation value χ$^\wedge$ of the angle χ is obtained by Eq. (16).

$$\chi^\wedge = \tan^{-1}\frac{-(v\delta c - R\cdot i\delta c)}{v\gamma c - R\cdot i\gamma c} \quad (16)$$

Therefore, the estimation values λ1γc$^\wedge$ and λ1δc$^\wedge$ are obtained as −sin(χ$^\wedge$)·Λδ$^\wedge$ and cos(χ$^\wedge$)·Λδ$^\wedge$, respectively.

Now, the estimation value Λδ$^\wedge$ of the primary magnetic flux Λδ can be calculated by using, for example, the estimation value of the primary magnetic flux in the α-β fixed coordinate system of the rotary electric motor 3. Herein, the α-β fixed coordinate system has the α axis and the β axis, and employs the β axis in 90-degree phase advance with the α axis. As described earlier, for example, the α axis is adopted in phase with the U phase.

Introducing an α-axis component λ1α$^\wedge$ and a β-axis component λ1β$^\wedge$ of the estimation value Λδ$^\wedge$ of the primary magnetic flux Λδ, the estimation value Λδ$^\wedge$ of the primary magnetic flux Λδ is obtained by Eq. (17).

$$\Lambda\delta^\wedge = \sqrt{\lambda1\alpha^{\wedge2}+\lambda1\beta^{\wedge2}} \quad (17)$$

Now, as shown in Eq. (18), the α-axis component λ1α$^\wedge$ and the β-axis component λ1β$^\wedge$ can be obtained by integration of the α-axis component V0α and the β-axis component V0β of the internal inductive voltage ω·Λδ with respect to the time. The α-axis component V0α can be calculated as Vα−R·iα from an α-axis component Vα of an applied voltage V observed outside and an α-axis component iα of the current [I] flowing in the rotary electric motor 3. Similarly, the β-axis component V0β can be calculated as Vβ−R·iβ from a β-axis component Vβ of the applied voltage V observed outside and a β-axis component iβ of the current [I] flowing in the rotary electric motor 3. The applied voltage V is obtained from, for example, the three-phase voltage supplied from the voltage supply source 2 to the rotary electric motor 3 in conformity with FIG. 4.

$$\lambda1\alpha^\wedge = f(V0\alpha)dt = f(V\alpha - R\cdot i\alpha)dt$$

$$\lambda1\beta^\wedge = f(V0\beta)dt = f(V\beta - R\cdot i\beta)dt \quad (18)$$

Further, when the a-axis component λ1α$^\wedge$ and the β-axis component λ1β$^\wedge$ are obtained, the estimation values λ1γc$^\wedge$ and λ1δc$^\wedge$ can be also obtained by another method. In other words, the estimation values λ1γc$^\wedge$ and λ1δc$^\wedge$ can be obtained by Eq. (19) by using the phase θ of the δc axis with respect to the α axis.

$$\begin{bmatrix}\lambda1\gamma c^\wedge \\ \lambda1\delta c^\wedge\end{bmatrix} = \begin{pmatrix}-\sin\theta & \cos\theta \\ \cos\theta & \sin\theta\end{pmatrix}\begin{bmatrix}\lambda1\alpha^\wedge \\ \lambda1\beta^\wedge\end{bmatrix} \quad (19)$$

Further, the α-axis component λ1α$^\wedge$ and the β-axis component λ1β$^\wedge$ can be obtained by another method. As described above, since the applied voltage V can be obtained from the three-phase voltage supplied from the voltage supply source 2 to the rotary electric motor 3, the U-phase component Vu, the V-phase component Vv, and the W-phase component Vw can be measured. As described above, the three-phase current Iu, Iv, and Iw flowing in the rotary electric motor 3 can be measured. Therefore, the U-phase component λ1u$^\wedge$, the V-phase component λ1v$^\wedge$, and the W-phase component λ1w$^\wedge$ of the estimation value Λδ$^\wedge$ of the primary magnetic flux Λδ can be obtained by Eq. (20), like by Eq. (18).

$$\lambda1u^\wedge = f(Vu - R\cdot Iu)dt$$

$$\lambda1v^\wedge = f(Vv - R\cdot Iv)dt$$

$$\lambda1w^\wedge = f(Vw - R\cdot Iw)dt \quad (20)$$

By performing the coordinate conversion of the UVW-phases and the α-β fixed coordinate system, the a-axis component λ1α$^\wedge$ and the β-axis component λ1β$^\wedge$ can be obtained by Eq. (21). Therefore, by further using Eq. (19), the estimation values λ1γc$^\wedge$ and λ1δc$^\wedge$ can be obtained.

$$\begin{bmatrix}\lambda1\alpha^\wedge \\ \lambda1\beta^\wedge\end{bmatrix} = \begin{pmatrix}\sqrt{2/3} & -\sqrt{1/6} & -\sqrt{1/6} \\ 0 & 1/\sqrt{2} & -1/\sqrt{2}\end{pmatrix}\begin{bmatrix}\lambda1u^\wedge \\ \lambda1v^\wedge \\ \lambda1w^\wedge\end{bmatrix} \quad (21)$$

When complete integration is performed in the integral calculation of Eqs. (18) and (20), the DC component is superimposed and the error in the estimation of the magnetic flux thereby becomes larger. Therefore, it is preferable to perform the well-known incomplete integration.

Figure 11:
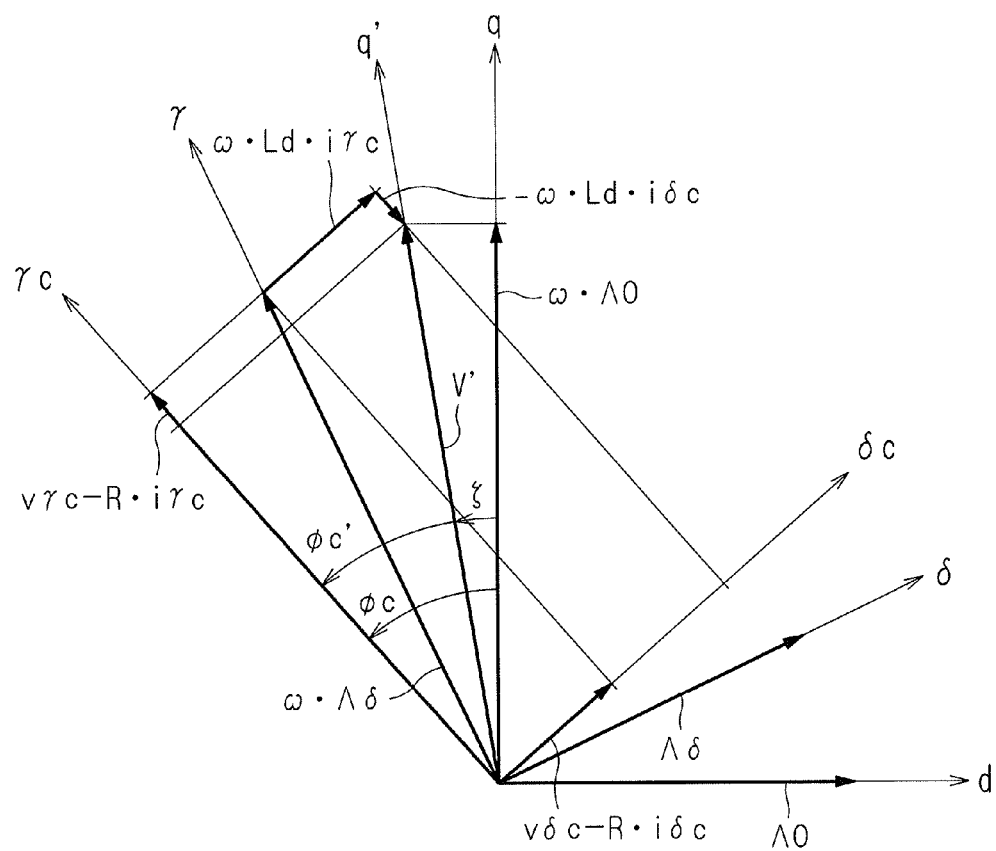
FIG. 11 is a vector diagram illustrating a variation.

Further, instead of Eq. (11), the phase difference φc can be estimated as follows. Though FIG. 11 corresponds to FIG. 7, a q' axis is newly employed. Herein, the q' axis is adopted in phase with a voltage V'. The voltage V' is a synthesis of the inductive voltage ω·Λδ caused by the primary magnetic flux and a voltage having a δc-axis component ω·Ld·iγc and a γc-axis component (−ω·Ld·iδc).

Introducing a leading phase angle φc' of the γc axis viewed from the q' axis and a leading phase angle ξ of the q' axis viewed from the q axis, an estimation value of the phase difference φc can be obtained as a sum of the angles φc' and ξ. Then, the angles φc' and ξ can be obtained by Eqs. (22) and (23), respectively.

$$\phi c' = \tan^{-1} \frac{v\delta c - R \cdot i\delta c + \omega \cdot Ld \cdot i\gamma c}{v\gamma c - R \cdot i\gamma c - \omega \cdot Ld \cdot i\delta c} \quad (22)$$

$$\zeta = \cos^{-1}(\omega \cdot \Lambda 0/|V'|) \quad (23)$$

$$= \cos^{-1}\left(\frac{\omega \cdot \Lambda 0}{\sqrt{(v\gamma c - R \cdot i\gamma c - \omega \cdot Ld \cdot i\delta c)^2 + (v\delta c - R \cdot i\delta c - \omega \cdot Ld \cdot i\gamma c)^2}}\right)$$

In any one of the above-described preferred embodiments, the electric motor controller 1 includes a microcomputer and a memory device. The microcomputer executes each process step (in other words, each procedure) described in a program. The above memory device can be constituted of one or a plurality of memory devices such as a Read Only Memory (ROM), a Random Access Memory (RAM), a rewritable nonvolatile memory (Erasable Programmable ROM (EPROM) or the like), a hard disk unit, and the like. The memory device stores therein various information and data and the like, also stores therein a program to be executed by the microcomputer, and provides a work area for execution of the program.

It can be grasped that the microcomputer functions as various means corresponding to each of the process steps described in the program, or that the microcomputer implements various functions corresponding to each of the process steps. Further, the electric motor controller 1 is not limited thereto, and some or all of the various procedures executed by the electric motor controller 1, or some or all of the various means or various functions implemented by the electric motor controller 1 may be achieved by hardware.

While the disclosure has been shown and described in detail, the foregoing description is in all aspects illustrative and not restrictive. It is therefore understood that numerous modifications and variations can be devised without departing from the scope of the disclosure.

The invention claimed is:

1. An electric motor controller which is a device for controlling a primary magnetic flux on a rotary electric motor including an armature having an armature winding and a rotor which is a field rotating relatively to said armature, said primary magnetic flux being a synthesis of a field flux that said field generates and a magnetic flux of an armature reaction generated by an armature current flowing in said armature, comprising:
   a first coordinate conversion unit that converts said armature current into a first current in a rotating coordinate system having a predetermined phase with respect to rotation of said rotor;
   a first calculation unit that sums an inductive voltage by a primary magnetic flux command value which is a command value of said primary magnetic flux and a voltage drop by said first current on the basis of a voltage equation of said rotary electric motor to obtain a first term;
   a second calculation unit that sums said first term and a second term obtained by performing an operation expressed by a non-zero matrix on a deviation of said primary magnetic flux with respect to said primary magnetic flux command value to obtain a first voltage command value which is a command value of a voltage to be applied to said rotary electric motor in said rotating coordinate system; and
   a second coordinate conversion unit that coordinate-converts said first voltage command value into a second voltage command value which is a command value of said voltage to be applied to said rotary electric motor in another coordinate system,
   wherein said second calculation unit employs an estimation value of said primary magnetic flux as said primary magnetic flux.

2. The electric motor controller according to claim 1, further comprising:
   a primary magnetic flux estimation unit that obtains said estimation value of said primary magnetic flux from said predetermined phase, a first component orthogonal to said field flux of an inductance of said armature winding, a second component in phase with said field flux of said inductance, said first current, and said field flux.

3. The electric motor controller according to claim 2, further comprising:
   a primary magnetic flux command correction unit that corrects said primary magnetic flux command value to output a primary magnetic flux command correction value by using said predetermined phase, said first component, said second component, said first current, said field flux, and said estimation value of said primary magnetic flux,
   wherein said second calculation unit employs said primary magnetic flux command correction value as said primary magnetic flux command value.

4. The electric motor controller according to claim 3, wherein
   an estimation value of said predetermined phase is employed as said predetermined phase.

5. The electric motor controller according to claim 4, wherein
   said estimation value of said predetermined phase is obtained from said primary magnetic flux command value, a resistance value of said armature winding, said first component, a rotation angular velocity of said rotor, and said first current.

6. The electric motor controller according to claim 2, wherein
   an estimation value of said predetermined phase is employed as said predetermined phase.

7. The electric motor controller according to claim 6, wherein
   said estimation value of said predetermined phase is obtained from said primary magnetic flux command value, a resistance value of said armature winding, said first component, a rotation angular velocity of said rotor, and said first current.

8. The electric motor controller according to claim 1, further comprising:
   a primary magnetic flux command correction unit that corrects said primary magnetic flux command value to output a primary magnetic flux command correction value by using said predetermined phase, a first component orthogonal to said field flux of an inductance of said armature winding, a second component in phase with said field flux of said inductance, said first current, said field flux, and said estimation value of said primary magnetic flux,
   wherein said second calculation unit employs said primary magnetic flux command correction value as said primary magnetic flux command value.

9. The electric motor controller according to claim 8, wherein
an estimation value of said predetermined phase is employed as said predetermined phase.

10. The electric motor controller according to claim 9, wherein
said estimation value of said predetermined phase is obtained from said primary magnetic flux command value, a resistance value of said armature winding, said first component, a rotation angular velocity of said rotor, and said first current.

* * * * *